United States Patent
Selmeier et al.

(10) Patent No.: US 12,196,129 B2
(45) Date of Patent: Jan. 14, 2025

(54) COMPRESSOR WITH COUNTER-ROTATING BLADE ROWS

(71) Applicants: General Electric Company, Schenectady, NY (US); General Electric Deutschland Holding GmbH, Frankfurt (DE)

(72) Inventors: Rudolf K. Selmeier, Fahrenzhausen (DE); Jeffrey Donald Clements, Mason, OH (US)

(73) Assignees: General Electric Company, Evendale, OH (US); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 17/341,862

(22) Filed: Jun. 8, 2021

(65) Prior Publication Data
US 2022/0389862 A1    Dec. 8, 2022

(51) Int. Cl.
*F02C 3/067* (2006.01)
*F04D 19/02* (2006.01)

(52) U.S. Cl.
CPC ............ *F02C 3/067* (2013.01); *F04D 19/024* (2013.01); *F05D 2220/32* (2013.01); *F05D 2240/60* (2013.01)

(58) Field of Classification Search
CPC ................................ F02C 3/067; F04D 19/024
See application file for complete search history.

(56) References Cited

U.S. PATENT DOCUMENTS

| | | | |
|---|---|---|---|
| 3,385,509 A * | 5/1968 | Garnier | F04D 19/024 |
| | | | 415/914 |
| 6,732,502 B2 | 5/2004 | Seda et al. | |
| 6,966,174 B2 | 11/2005 | Paul | |
| 7,950,220 B2 | 5/2011 | Merry et al. | |
| 8,015,798 B2 | 9/2011 | Norris et al. | |
| 8,061,968 B2 | 11/2011 | Merry et al. | |
| 8,667,773 B2 | 3/2014 | Silkowski | |
| 10,077,660 B2 * | 9/2018 | Hofer | F02K 3/065 |
| 10,378,551 B2 | 8/2019 | Vo | |

(Continued)

FOREIGN PATENT DOCUMENTS

| | | |
|---|---|---|
| DE | 102014017393 A1 | 3/2016 |
| EP | 3412876 A1 | 12/2018 |

*Primary Examiner* — Courtney D Heinle
*Assistant Examiner* — John S Hunter, Jr.
(74) *Attorney, Agent, or Firm* — Dority & Manning, P.A.

(57) ABSTRACT

A compressor section of a gas turbine engine includes an upstream portion and a downstream portion. The upstream portion includes at least one stage of stator vanes and at least one stage of blades configured to rotate about an axial centerline of the compressor section. The at least one stage of stator vanes and the at least one stage of blades are in an alternating arrangement along an axial direction of the gas turbine engine. The downstream portion is disposed immediately adjacent to and downstream along the axial direction from the upstream portion. The downstream portion includes a first set of rotating blade rows and a second set of rotating blade rows. The first and second sets of rotating blade rows are in an alternating arrangement along the axial direction of the gas turbine engine. The first and second sets of rotating blade rows are in a counter-rotating arrangement.

17 Claims, 4 Drawing Sheets

(56) References Cited

U.S. PATENT DOCUMENTS

| | | | |
|---|---|---|---|
| 10,465,702 B2 * | 11/2019 | Gallagher | F04D 29/563 |
| 10,975,717 B2 | 4/2021 | Moniz et al. | |
| 11,085,309 B2 | 8/2021 | Mondal et al. | |
| 2016/0053721 A1 | 2/2016 | Fletcher et al. | |
| 2019/0264701 A1 | 8/2019 | Rowe | |
| 2020/0088108 A1 | 3/2020 | Klein et al. | |

* cited by examiner

COMPRESSOR WITH COUNTER-ROTATING BLADE ROWS

FIELD

The present disclosure relates to compressor sections of gas turbine engines. In particular, the present disclosure relates to a compressor section of a gas turbine engine with counter-rotating blade rows.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. Other sections of the gas turbine engine can include a compressor section, a combustion section, a turbine section, and an exhaust section.

In existing gas turbine engines, compressor sections can include a variable geometry upstream section combined with a fixed geometry downstream section with both the upstream and downstream sections being non-counter-rotating. Such configurations in existing multi-stage compressors can cause the compressor to be large and heavy.

BRIEF DESCRIPTION

Aspects and advantages of the disclosure will be set forth in part in the following description, or may be obvious from the description, or may be learned through practice of the disclosure.

A gas turbine engine defines an axial centerline, an axial direction, and includes a compressor section configured to rotate about the axial centerline. The compressor section includes an upstream portion and a downstream portion. The upstream portion includes at least one stage of stator vanes and at least one stage of blades are in an alternating arrangement along the axial direction. The downstream portion is disposed downstream from the upstream portion and includes a first plurality of stages of blades and a second plurality of stages of blades. The first plurality of stages of blades and the second plurality of stages of blades are in an alternating arrangement along the axial direction and are in a counter-rotating arrangement.

A compressor section of a gas turbine engine includes an upstream portion and a downstream portion. The upstream portion includes at least one stage of stator vanes and at least one stage of blades configured to rotate about an axial centerline of the compressor section. The at least one stage of stator vanes and the at least one stage of blades are in an alternating arrangement along an axial direction of the gas turbine engine. The downstream portion is disposed immediately adjacent to and downstream along the axial direction from the upstream portion. The downstream portion includes a first set of rotating blade rows and a second set of rotating blade rows. The first and second sets of rotating blade rows are in an alternating arrangement along the axial direction of the gas turbine engine. The first and second sets of rotating blade rows are in a counter-rotating arrangement.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
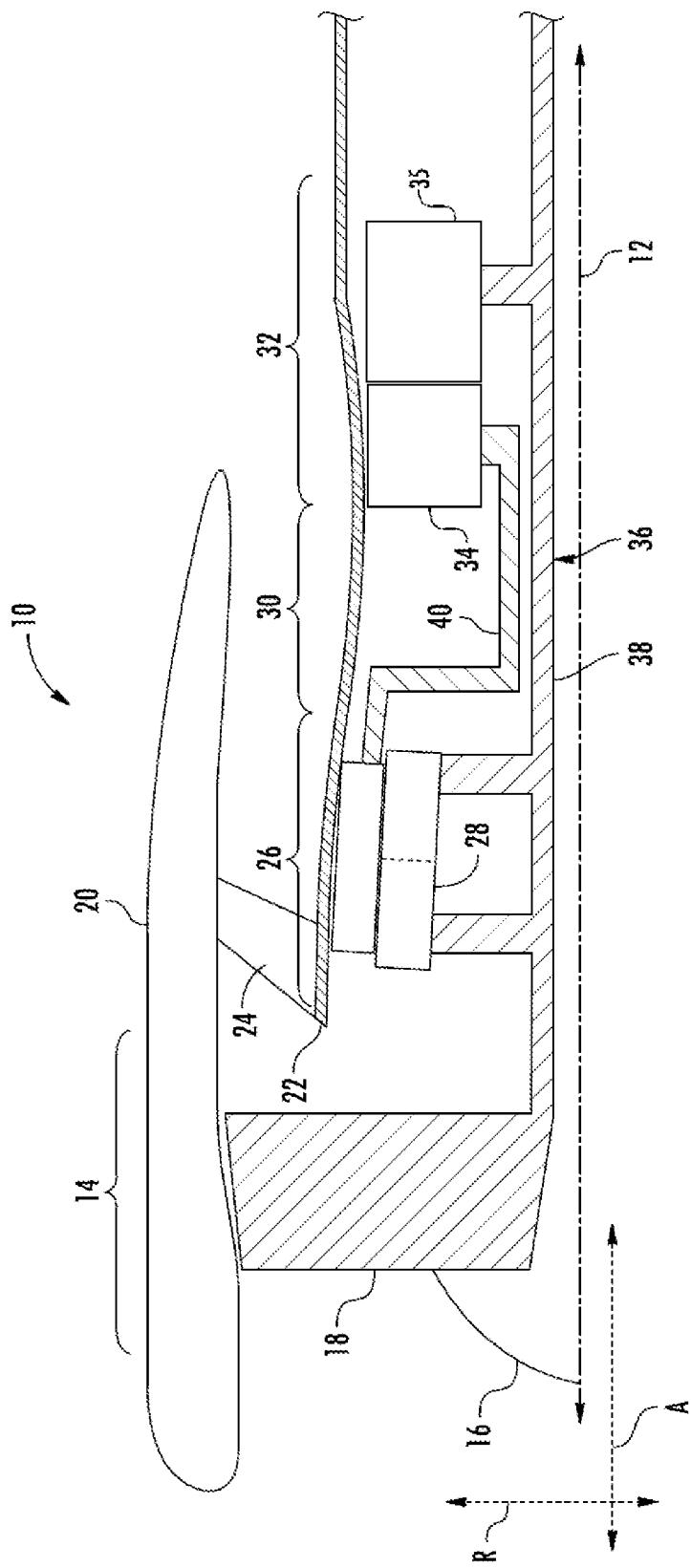
FIG. 1 is a schematic cross sectional view of an exemplary gas turbine engine incorporating an exemplary embodiment according to an aspect of the present disclosure

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure proposes a compressor arrangement with a front block optionally including one or more variable pitch stator blade-rows followed by rotating blade rows, combined with a downstream portion including counter-rotating blade-rows. The downstream portion generally includes a first plurality of rotating blade rows and a second plurality of rotating blade rows. The first plurality of rotating blade rows are alternatingly spaced with, and counter-rotating with, the second plurality of rotating blade rows. Additionally, the first plurality of rotating blade rows of the downstream portion are directly coupled to the rotating blade rows of the front block via, e.g., a common rotor or shaft arrangement. The disclosed compressor arrangement combines the advantages of variable geometry in the front block of the compressor with that of counter-rotating blade-rows in the fixed geometry rear stages to enable a smaller size envelope and lighter weight of the compressor. For example, the variable geometry stator blade row(s) in the front block may allow for modification of the airflow volumes as needed based on the flight condition or other operating parameter. By contrast, the counter-rotating blade rows of the downstream portion may allow for a more compact and efficient compressor operation.

Among other benefits, the examples described herein achieve a technical effect of decreased fuel consumption, increased operability, increased engine performance and/or increased power output while maintaining or reducing weight, part count, and/or packaging (e.g. radial and/or axial dimensions). The embodiments provided herein may allow for increased high bypass ratios and/or overall pressure ratios over existing gas turbine engine configurations, such as turbofans, while maintaining or reducing packaging relative to other gas turbine engines of similar power output. The embodiments described herein may contribute to improved bypass ratio and/or overall pressure ratio and thereby increase overall gas turbine engine efficiency.

Referring now to the drawings, FIG. 1 is a schematic cross sectional view of an exemplary gas turbine engine 10 and shows a axial centerline 12, a fan section 14 (with a fan rotor 16 and fan blades 18), a nacelle 20, outlet guide vanes 24, a compressor section 26 (with rotor blades 28), a combustor section 30, a turbine section 32 (with first turbine 34 and second turbine 35) and a shaft assembly 36 (with a second shaft 40 and a first shaft 38).

In FIG. 1, gas turbine engine 10 is shown as a high bypass turbofan engine, incorporating an exemplary embodiment of compressor section 26 according to an aspect of the present disclosure. Although further described below with reference to a turbofan engine, the present disclosure is also applicable to turbomachinery in general, including propfan, turbojet, turboprop, and turboshaft gas turbine engines. Moreover, although the gas turbine engine 10 is depicted as an aeronautical gas turbine engine, in other exemplary embodiments, aspects of the present disclosure may be incorporated into marine and industrial turbine engines and auxiliary power units. As shown in FIG. 1, the gas turbine engine 10 defines a longitudinal or axial centerline 12 that extends there through for reference purposes, an axial direction A, a radial direction R, and a circumferential direction (not shown) that extents about the axial centerline 12.

In general, gas turbine engine 10 may include a substantially tubular outer casing 22. Outer casing 22 encases or at least partially encases, in serial flow arrangement along the axial direction A, compressor section 26, combustor section 30, and turbine section 32. Fan section 14 is disposed generally forward or upstream of compressor section 26 in the embodiment shown.

In this example, gas turbine engine 10 can define a two-spool configuration in which compressor section 26 is arranged in an alternating or counter-rotating arrangement along the axial direction A of gas turbine engine 10, as will be explained in more detail below.

Fan section 14 is coupled to and driven by first shaft 38. Compressor section 26 is coupled to and driven by first shaft 38. More specifically, the compressor section 26 includes a first portion that is driven by the second shaft 40 and a second portion that is driven by the first shaft 38, as will be explained in more detail below. In yet other embodiments, gas turbine engine 10 may define a three-spool configuration.

In this example, fan section 14 includes at least one stage of a plurality of fan blades 18 coupled to fan rotor 16. Fan blades 18 are coupled to and extend outwardly from fan rotor 16 along the radial direction R of gas turbine engine 10. In various embodiments, fan rotor 16 may include a plurality of stages of fan blades 18 along the axial direction A of gas turbine engine 10.

Nacelle 20 circumferentially surrounds at least a portion of fan section 14 and/or at least a portion of outer casing 22. In the embodiment shown, nacelle 20 is supported relative to outer casing 22 by circumferentially-spaced outlet guide vanes 24. At least a portion of nacelle 20 may extend over an outer portion (along the radial direction R) of outer casing 22 so as to define a bypass airflow passage therebetween.

In other embodiments, fan section 14 may further include a speed reduction assembly disposed between fan rotor 16 and first shaft 38 coupled to turbine section 32. The speed reduction assembly may reduce the rotational speed of fan rotor 16 relative to the turbine rotor of turbine section 32 to which fan rotor 16 is attached via first shaft 38.

Referring still to FIG. 1, during operation of gas turbine engine 10 a volume of air enters gas turbine engine 10 through an inlet of fan section 14. As the air passes across fan blades 18, a portion of the air is directed or routed into a bypass airflow passage while another portion of the air is directed through fan section 14 and into compressor section 26. The air is progressively compressed as it flows through compressor section 26 toward combustor section 30.

The now compressed air flows into combustor section 30 where a fuel is introduced, mixed with at least a portion of the compressed air, and ignited to form combustion gases. The combustion gases flow into turbine section 32, causing rotor assemblies of turbine section 32 to rotate and support operation of respectively coupled rotary members in compressor section 26 and/or fan section 14.

Figure 2:
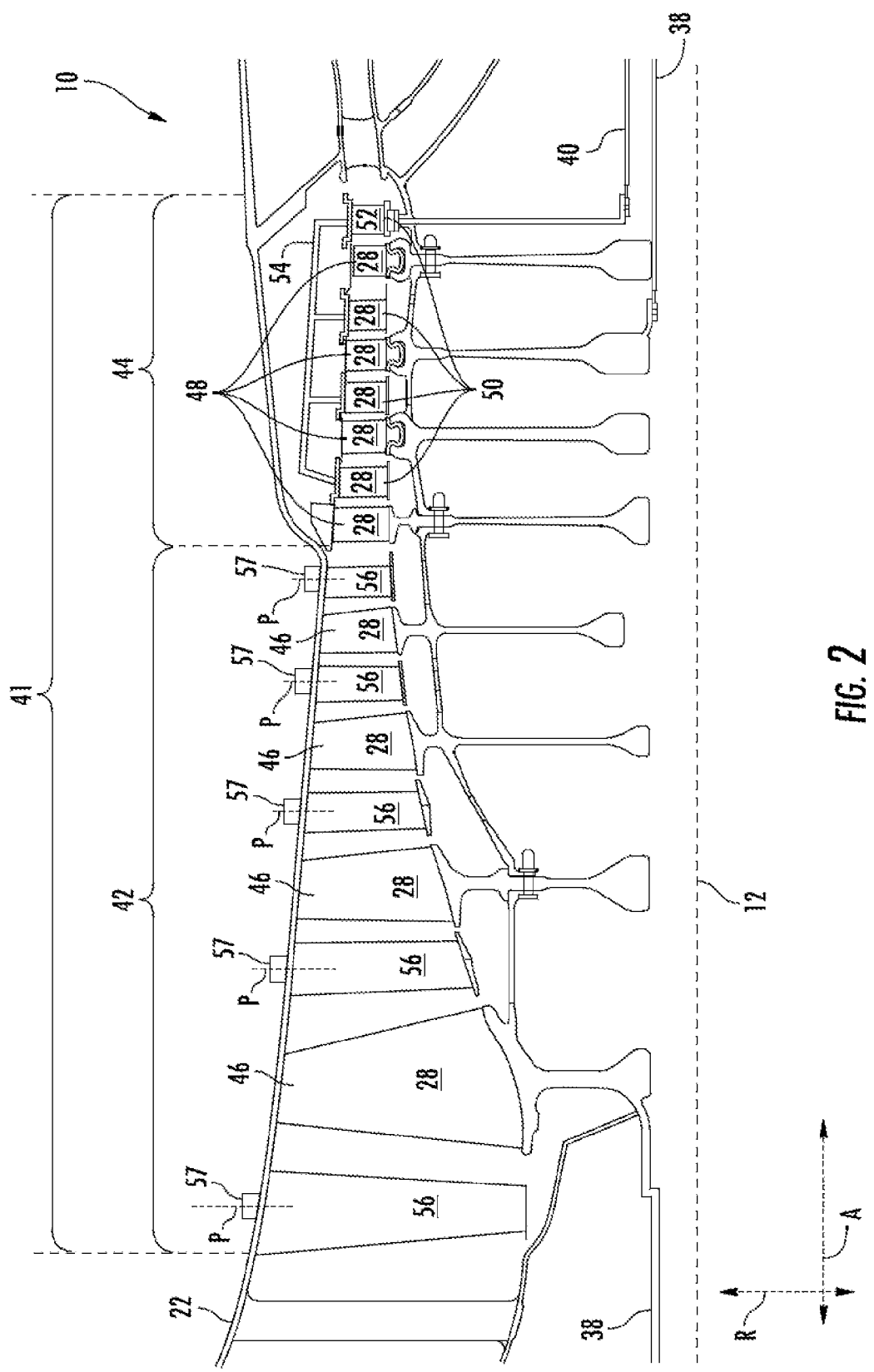
FIG. 2 is a cross-section view of a compressor section of the gas turbine engine and shows an upstream portion and a downstream portion of the compressor section.

Referring now to FIG. 2, FIG. 2 is a cross-section view of a portion of gas turbine engine 10 including a compressor 41 in accordance with an exemplary embodiment of the present disclosure. The gas turbine engine 10 of FIG. 2 may be configured in a similar manner as the exemplary gas turbine engine 10 of FIG. 1. The gas turbine engine 10 of FIG. 2 defines axial centerline 12 and includes outer casing 22, shaft assembly 36 (with second shaft 40 and first shaft 38), and a compressor 41 (with an upstream portion 42, a downstream portion 44, rotor blades 28 (including an upstream set 46, a first downstream set 48, and a second downstream set 50), a structural member 52, an outer drum 54, stator vanes 56, and pitch change mechanisms 57).

The various embodiments of compressor 41 generally shown and described herein may be constructed as individual blades installed into drums or hubs, or integrally bladed rotors or bladed disks, or combinations thereof. The blades, hubs, or bladed disks may be formed of ceramic matrix composite materials and/or metals appropriate for hot sections of gas turbine engine 10, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. Compressor 41, or portions or combinations of portions thereof, may be formed using additive manufacturing or 3D printing, or casting, forging, machining, or castings formed of 3D printed molds, or combinations thereof. Compressor 41, or portions thereof, may be mechanically joined using fasteners, such as nuts, bolts, screws, pins, or rivets, or using joining methods, such as welding, brazing, bonding, friction or diffusion bonding, etc., or combinations of fasteners and/or joining methods. Still further, it should be understood that first downstream set 48 of rotor blades 28 and second downstream set 50 of rotor blades 28 may incorporate features that allow for differential expansion.

Here, compressor 41 is shown with upstream portion 42 and downstream portion 44. Downstream portion 44 is disposed immediately adjacent to and downstream along the axial direction A from upstream portion 42. Put another way, downstream portion 44 is positioned next to and directly abutting the upstream portion 42. Downstream portion 44 of compressor 41 is shown to include first downstream set 48 of rotor blades 28 and second downstream set 50 of rotor blades 28 in alternating arrangement along the axial direction A (e.g., counter-rotating arrangement).

Upstream set 46, first downstream set 48, and second downstream set 50 are groupings of rotor blades 28. In this example, upstream set 46 includes four stages of rotor blades 28. In other examples, upstream set 46 can include more or less than four stages of rotor blades 28. In this example, first downstream set 48 includes four stages of rotor blades 28. In other examples, first downstream set 48 can include more or less than four stages of rotor blades 28. In this example, first downstream set 48 of rotor blades 28 of downstream portion 44 and upstream set 46 of rotor blades 28 of upstream portion 42 are configured to rotate with one another in a ratio ranging from 2:1 to 1:2. In one example, first downstream set 48 of rotor blades 28 of downstream portion 44 and upstream set 46 of rotor blades 28 of upstream portion 42 are configured to rotate with one another in a ratio of 1:1. For example, first downstream set 48 of rotor blades 28 of downstream portion 44 and upstream set 46 of rotor blades 28 of upstream portion 42 are directly coupled to the same shaft (e.g., first shaft 38). In certain exemplary embodiments, rotor blades 28 of first downstream set 48 of rotor blades 28 and second downstream set 50 can include fixed geometry rotor blades.

In this example, second downstream set 50 includes three stages of rotor blades 28 and one stage of structural members 52. In other examples, second downstream set 50 can include more or less than three stages of rotor blades 28 and one stage of structural members 52. Structural member 52 ("structural members 52") is a structural vane. Structural members 52 may include an airfoil, such as an airfoil including a pressure side, a suction side, a leading edge, and a trailing edge. In this example, a plurality of structural members 52 is disposed circumferentially about axial centerline 12. In this example, structural member 52 is a rotating stage of rotor blades 28 with second downstream set 50 of rotor blades 28. In various embodiments, structural members 52 can define a generally perpendicular, acute, or obtuse lean angle relative to axial centerline 12. Structural members 52 generally provide support relative to an axial load, such as generated by combustion gases from combustor section 30.

Outer drum 54 is an annular ring configured to rotate about axial centerline 12. In this example, outer drum 54 includes a frustoconical shape. Outer drum 54 extends along the circumferential direction around axial centerline 12. Outer drum 54 extends along the axial direction A and at least partially surrounds second downstream set 50 of rotor blades 28. Outer drum 54 drives rotation of second downstream set 50 of rotor blades 28 of downstream portion 44 of compressor 41 via torque transferred from second shaft 40 via structural member 52.

Stator vanes 56 are airfoils disposed circumferentially about axial centerline 12. In this example, stator vanes 56 of upstream portion 42 are variable stator vanes (e.g., variable geometry vanes) each with a pitch change mechanism. In this example, stator vanes 56 include five stages of stator vanes 56. In other examples, stator vanes 56 can include more or less than five stages of stator vanes 56. In yet other examples, any one or more of stator vanes 56 can include a stationary or fixed guide vane. In this example, the upstream most (furthest to the left as shown in FIG. 2) stator vane 56 can be a variable inlet guide vane disposed upstream from the other stages of stator vanes 56 and from upstream set 46 of rotor blades 28. Pitch change mechanisms 57 are elements configured to drive rotation of stator vanes 56 about respective pitch axes P.

In this example, second shaft 40 rotates in an opposite direction from first shaft 38. Likewise, first downstream set 48 of rotor blades 28 and second downstream set 50 of rotor blades 28 are rotatable about opposite directions about axial centerline 12 of gas turbine engine 10. Put another way, first downstream set 48 of rotor blades 28 rotates in an opposite direction from second downstream set 50 of rotor blades 28. In such a manner, first downstream set 48 of rotor blades 28 and second downstream set 50 of rotor blades 28 are in a counter-rotating arrangement (i.e., rotating in opposite directions around axial centerline 12 relative to one another).

As disclosed, compressor 41 presents a compressor arrangement with upstream portion 42 including variable pitch stator vane rows (e.g., stator vanes 56) followed by rotating blade rows (e.g., rotor blades 28), combined with downstream portion 44 including counter-rotating blade-rows (e.g., first downstream set 48 and second downstream set 50 of rotor blades 28). Here, compressor 41 with counter-rotating blades in downstream portion 44 provides the advantage of a compressor with variable geometry in upstream portion 42 with downstream portion 44, which is shorter due to its counter-rotation feature. The disclosed arrangement of compressor 41 combines the advantages of variable geometry in upstream portion 42 of compressor 41 with that of counter-rotating blade-rows in the fixed geometry stages of downstream portion 44 to enable a smaller size envelope and lighter weight of compressor 41 as compared to existing compressors.

In regard to the embodiments of compressor 41, the embodiments generally provided herein may improve upon existing counter-rotating compressor sections by providing enabling improved fuel efficiency, operational efficiency, and/or power output while maintaining or reducing weight, part count, and/or packaging. In one example, first downstream set 48 of rotor blades 28 counter-rotating among second downstream set 50 of rotor blades 28 may reduce packaging (e.g., longitudinal and/or radial dimensions) and reduce part count by removing stages of stationary airfoils between each rotating component.

Figure 3:
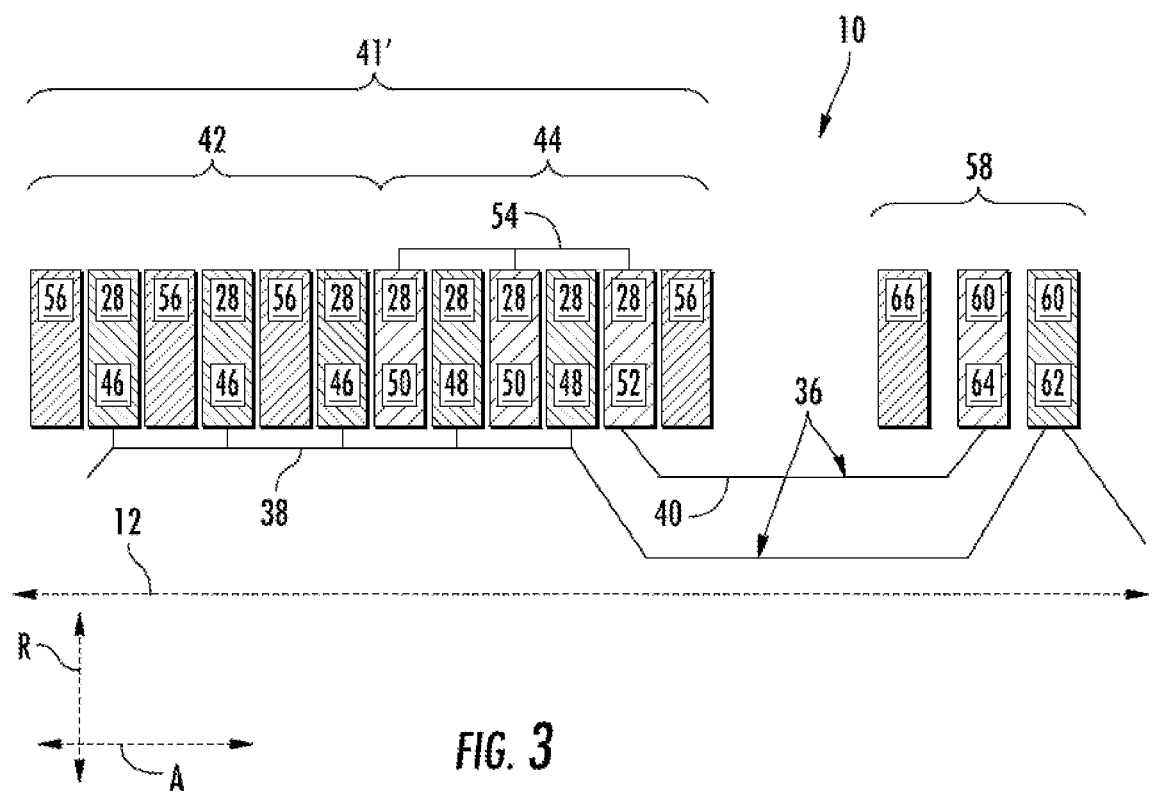
FIG. 3 is a simplified schematic view of a first compressor section and a first turbine that shows the first compressor section with an upstream portion and a downstream portion with a counter-rotating blade arrangement.

Referring now to FIG. 3, a simplified schematic view is provided of a gas turbine engine 10 in accordance with another exemplary embodiment of the present disclosure. In certain exemplary embodiments, the exemplary gas turbine engine 10 of FIG. 3 may be configured in substantially the same manner as exemplary gas turbine engine 10 of FIG. 2. For example, the gas turbine engine 10 defines an axial centerline 12 and includes a shaft assembly 36 (with a second shaft 40 and a first shaft 38), a compressor 41' (with an upstream portion 42, a downstream portion 44, rotor blades 28 (including an upstream set 46, a first downstream set 48, and a second downstream set 50), a structural member 52, an outer drum 54, and a stator vanes 56), and a first turbine section 58 (with a first set 62 of rotor blades 60, a second set 64 of rotor blades 60, and a stator vane 66).

In this example, upstream set 46 includes three stages of rotor blades 28. In other examples, upstream set 46 can include more or less than three rotor blades 28. In this example, first downstream set 48 includes two stages of rotor blades 28. In other examples, first downstream set 48 can include more or less than two stages of rotor blades 28. In this example, second downstream set 50 includes three stages of rotor blades 28 (with one being a stage of structural member 52). In other examples, first downstream set 48 can include more or less than three stages of rotor blades 28.

First turbine section 58 is a turbine section of gas turbine engine 10 (see, e.g., FIG. 1). In this example, first turbine section 58 can be referred to as a vaneless counter-rotating high pressure turbine. As used here, the term "vaneless" can refer to the absence of a stator stage and associated stator vanes disposed between (along an axial direction) adjacent rotor stages or rows of rotor blades 60 in first turbine section 58.

First set 62 of rotor blades 60 and second set 64 of rotor blades 60 are groupings of stages of rotor blades 60. In this example, first set 62 of rotor blades 60 includes one stage of rotor blades 60. In other examples, first set 62 of rotor blades 60 can include one or more stages of rotor blades 60. Second set 64 of rotor blades 60 includes one stage of rotor blade 60.

In other examples, second set 64 of rotor blades 60 can include one or more stages of rotor blades 60. Here, rotor blades 60 are mounted to respective rotor stages that have been omitted in FIGS. 3-6 for clarity. Such rotor stages include a disk with a plurality of rotor blades 60 mounted around the circumference of the disk. In this example, stator vane 66 can be an inlet guide vane.

Here in FIG. 3, compressor 41' is shown as being rotationally coupled to first turbine section 58 via shaft assembly 36. For example, second shaft 40 is affixed or coupled to second set 64 of rotor blades 60, to second downstream set 50 of rotor blades 28, and to structural member 52 in downstream portion 44 of compressor 41'. First shaft 38 is affixed or coupled to each of upstream set 46 of rotor blades 28, first downstream set 48 of rotor blades 28, and first set 62 of rotor blades 60 of first turbine section 58.

In this example, a vaneless counter-rotating high pressure turbine (e.g., first turbine section 58) is shown as being operably coupled to compressor 41'. In such a configuration, a compressor rear frame of a differential bearing may be included. Here, a power split is driven by a number of counter-rotating rotor stages (e.g., first downstream set 48 of rotor blades 28, second downstream set 50 of rotor blades 28, and structural member 52) of a high pressure compressor (e.g., compressor 41'). As with other embodiments shown herein, compressor 41' provides a desirable level of part speed operability with the counter-rotating compressor configuration providing a downstream section (e.g., shorter downstream portion 44) that is shorter than existing compressor configurations. The shorter size envelope of compressor 41' enables decreased size, weight, and cost over existing compressor configurations.

Figure 4:
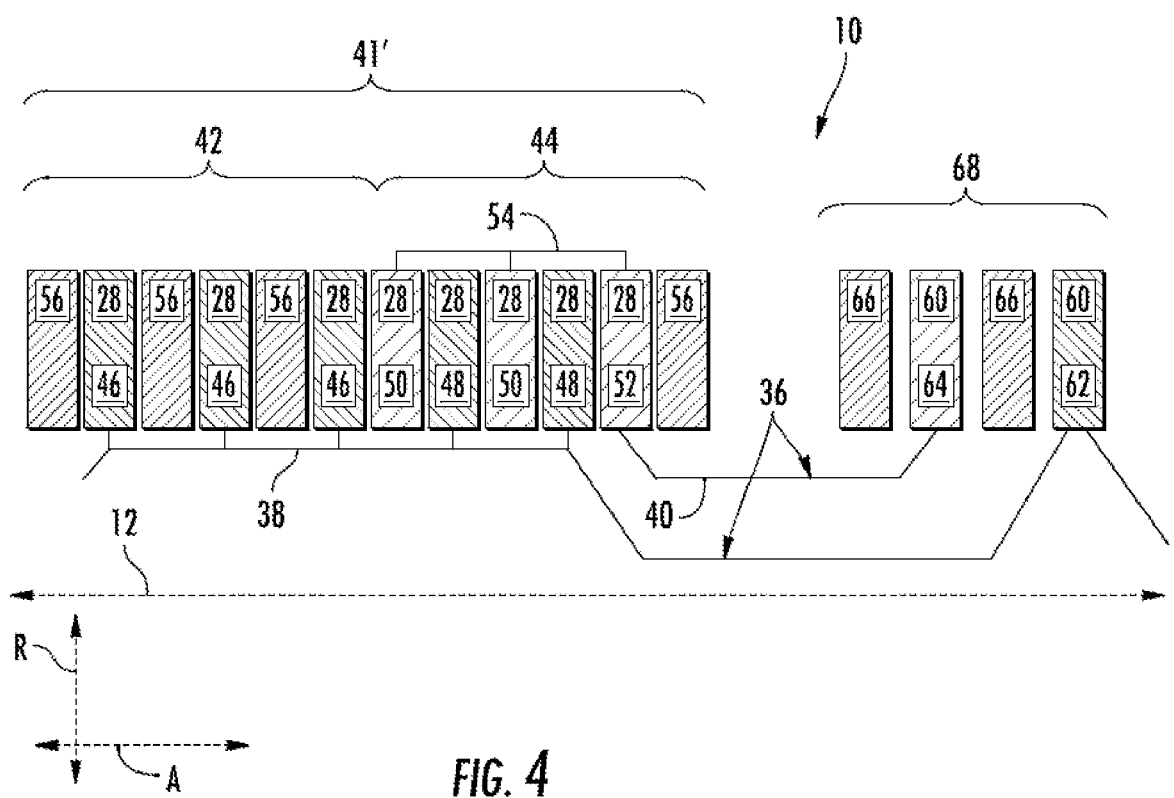
FIG. 4 is a simplified schematic view of a second compressor section and a second turbine that shows the second compressor section with an upstream portion and a downstream portion with a counter-rotating blade arrangement.

Referring now to FIG. 4, a simplified schematic view is provided of a gas turbine engine 10 in accordance with another exemplary embodiment of the present disclosure. In certain exemplary embodiments, the exemplary gas turbine engine 10 of FIG. 4 may be configured in substantially the same manner as exemplary gas turbine engine 10 of FIG. 2. For example, the gas turbine engine 10 defines axial centerline 12 and includes shaft assembly 36 (with a second shaft 40 and a first shaft 38), compressor 41' (with upstream portion 42, downstream portion 44, rotor blades 28 (including upstream set 46, first downstream set 48, and second downstream set 50), structural member 52, outer drum 54, and stator vanes 56), and second turbine section 68 (with first set 62 of rotor blades 60, second set 64 of rotor blades 60, and stator vanes 66).

In this example, second turbine section 68 is a vaned counter-rotating high pressure turbine section. As used here, the term "vaned" can refer to the presence of a stator stage and associated stator vanes 66 disposed between (along an axial direction) adjacent rotor stages or rows of rotor blades 60 in second turbine section 68. Second turbine section 68 includes two stages of stator vanes 66 with one stage of stator vanes 66 positioned at an upstream end of second turbine section 68 and the second row of stator vanes 66 positioned between stage of rotor blade 60 of first set 62 and stage of rotor blade 60 of second set 64.

Here, compressor 41' with second turbine section 68 as shown in FIG. 4 presents an alternate option from the option shown in FIG. 3 of first turbine section 58, with second turbine section 68 providing aft support.

Figure 5:
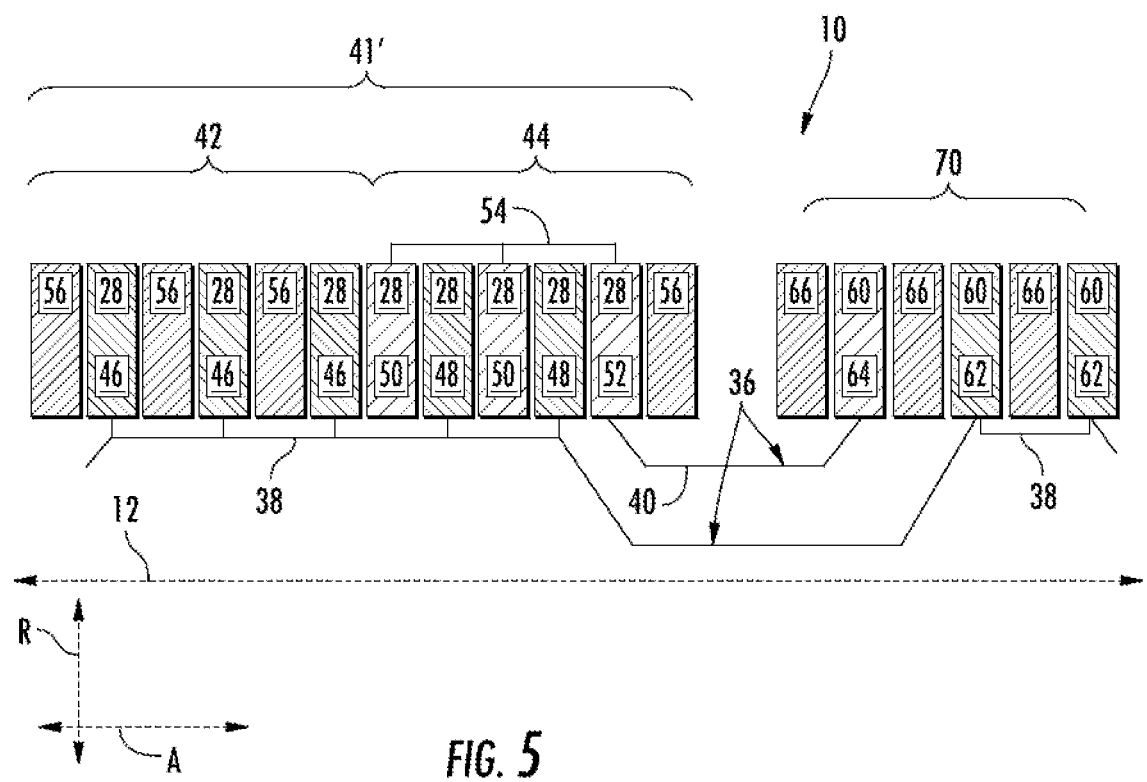
FIG. 5 is a simplified schematic view of a third compressor and a third turbine that shows the third compressor with an upstream portion and a downstream portion with a counter-rotating blade arrangement.

Referring now to FIG. 5, a simplified schematic view is provided of a gas turbine engine 10 in accordance with another exemplary embodiment of the present disclosure. In certain exemplary embodiments, the exemplary gas turbine engine 10 of FIG. 5 may be configured in substantially the same manner as exemplary gas turbine engine 10 of FIG. 2. For example, the gas turbine engine 10 defines axial centerline 12, shaft assembly 36 (with second shaft 40 and first shaft 38), compressor 41' (with upstream portion 42, downstream portion 44, rotor blades 28 (including upstream set 46, first downstream set 48, and second downstream set 50), structural member 52, outer drum 54, and stator vanes 56), and third turbine section 70 (with first set 62 of rotor blades 60, second set 64 of rotor blades 60, and stator vanes 66).

In this example, third turbine section 70 is a multi-stage vaned counter-rotating high pressure turbine section. Third turbine section 70 includes three stages of stator vanes 66 with one stage of stator vanes 66 positioned at an upstream end of third turbine section 70, a second stage of stator vanes 66 positioned between a stage of rotor blades 60 of first set 62 and a stage of rotor blades 60 of second set 64, and a third stage of stator vanes 66 positioned between the stages of rotor blades 60 of first set 62.

Here, compressor 41' with third turbine section 70 as shown in FIG. 5 presents an alternate option than those options shown in FIGS. 3 and 4, with third turbine section 70 providing enabling support of a high pressure compressor with a high pressure ratio.

Figure 6:
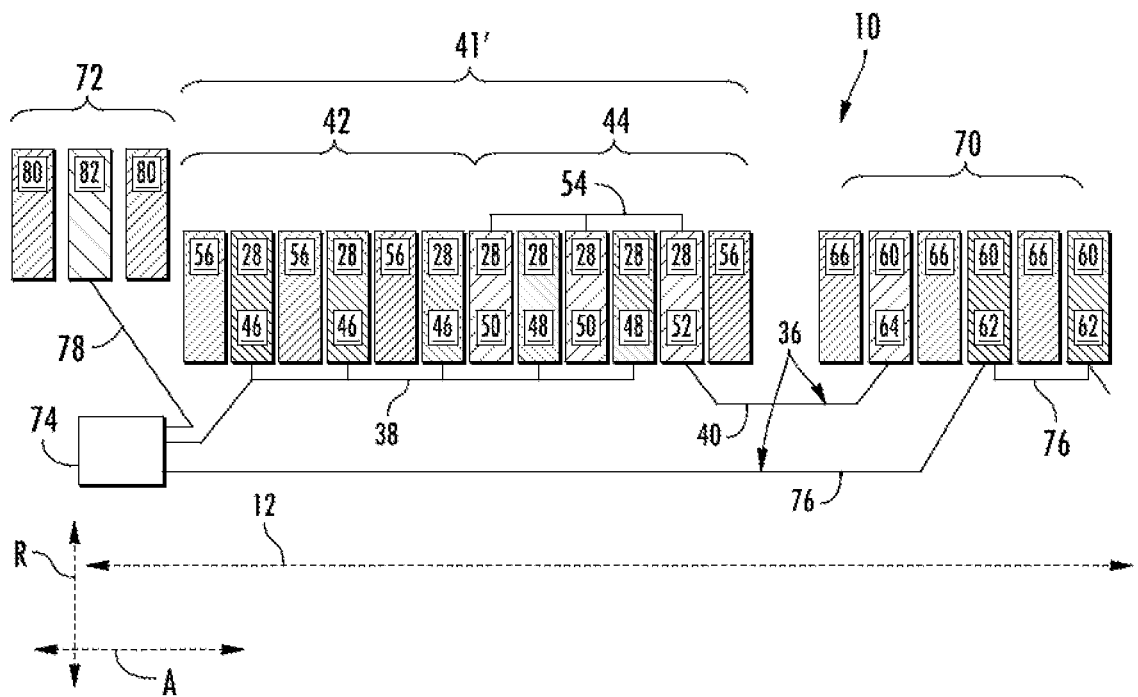
FIG. 6 is a simplified schematic view of a fourth compressor, a fourth turbine, a booster section, and a gearbox that shows the fourth compressor with an upstream portion and a downstream portion with a counter-rotating blade arrangement.

Referring now to FIG. 6, a simplified schematic view is provided of a gas turbine engine 10 in accordance with another exemplary embodiment of the present disclosure. In certain exemplary embodiments, the exemplary gas turbine engine 10 of FIG. 6 may be configured in substantially the same manner as exemplary gas turbine engine 10 of FIG. 2. For example, the gas turbine engine 10 defines axial centerline 12, compressor 41' (with upstream portion 42, downstream portion 44, rotor blades 28 (including upstream set 46, first downstream set 48, and second downstream set 50), structural member 52, outer drum 54, and stator vanes 56), shaft assembly 36 (with second shaft 40, first shaft 38, a third shaft 76, and a fourth shaft 78), third turbine section 70 (with first set 62 of rotor blades 60, second set 64 of rotor blades 60, and stator vanes 66), booster 72 (with stator vanes 80 and a rotor blade 82), and gearbox 74.

In this example, booster 72 can be a booster (e.g., booster compressor) of gas turbine engine 10. Gearbox 74 is a device for transferring rotational power via torque conversions from one rotating source to another. In this example, gearbox 74 can include one or more gears and can be in an epicyclic configuration. Third shaft 76 and fourth shaft 78 are rotating shafts disposed about axial centerline 12. Stator vanes 80 and rotor blade 82 are airfoils. In this example, stator vanes 80 are each connected to a respective stator stage. Likewise, rotor blade 82 is connected to a rotor stage configured to rotate about axial centerline 12. In FIG. 6, the stator stages and the rotor stages of compressor 41', of third turbine section 70, and of booster 72 are omitted for clarity.

In this example, first set 62 of rotor blades 60 is operably coupled to and is driven by fourth shaft 78. Second set 64 of rotor blades 60 is operably coupled to and is driven by first shaft 38.

Booster 72 is operably coupled to gearbox 74 via fourth shaft 78. In this example, booster 72 is disposed upstream from compressor 41' (with a downstream direction shown from left-to-right in FIG. 6). Gearbox 74 is coupled to booster 72 via fourth shaft 78 to facilitate rotating booster 72. Gearbox 74 is also operably coupled to first shaft 38, to fourth shaft 78, and to third shaft 76. Fourth shaft 78 is connected to and extends between gearbox 74 and booster 72. In this example, fourth shaft 78 is connected to rotor blade 82 of booster 72. Stator vanes 80 are coupled to stator stages positioned on both an upstream side and a downstream side of rotor blade 82. Rotor blade 82 is positioned between stator vanes 80. Rotor blade 82 also is operably coupled to and is driven by fourth shaft 78.

As third turbine section 70 is rotated in response to airflow from a combustor section of gas turbine engine 10, torque developed by third turbine section 70 is provided to gearbox 74. The torque transferred by gearbox 74 is then utilized to drive booster 72. Booster 72 adds velocity to the airflow passing across booster 72 due to the torque applied to rotor blade 82 of booster 72. Gearbox 74 is disposed to drive rotation of first shaft 38, fourth shaft 78, and third shaft 76 by transferring torque between first shaft 38, fourth shaft 78, and third shaft 76. Fourth shaft 78 transfers torque to a rotor stage (omitted from FIG. 6 for clarity) of booster 72 that rotor blade 82 is attached to. Stator vanes 80 guide and direct a flow of air though booster 72. Rotor blade 82 alters and propels the flow of air through booster 72.

Here, compressor 41' with third turbine section 70 and booster 72 as shown in FIG. 6 presents an alternate option from those options shown in FIGS. 3-5, with third turbine section 70 providing enabling support of a high pressure compressor with a high pressure ratio and with parts of the high pressure compressor and booster 72 being driven by gearbox 74.

This written description uses examples to describe the disclosure, including the best mode, and also to enable any person skilled in the art to practice the disclosed embodiments, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defines an axial centerline, an axial direction, and includes a compressor section configured to rotate about the axial centerline. The compressor section includes an upstream portion and a downstream portion. The upstream portion includes at least one stage of stator vanes and at least one stage of blades are in an alternating arrangement along the axial direction. The downstream portion is disposed downstream from the upstream portion and includes a first plurality of stages of blades and a second plurality of stages of blades. The first plurality of stages of blades and the second plurality of stages of blades are in an alternating arrangement along the axial direction and are in a counter-rotating arrangement.

The gas turbine engine of one or more of these clauses, further comprising a shaft assembly comprising first and second shafts disposed to rotate about the axial centerline of the gas turbine engine, wherein the first shaft is configured to rotate in an opposite direction from the second shaft, wherein the at least one stage of blades of the upstream portion and the first plurality of stages of blades of the downstream portion are driven by the first shaft, wherein the second plurality of stages of blades of the downstream portion is driven by the second shaft.

The gas turbine engine of one or more of these clauses, wherein the gas turbine engine further defines a radial direction and further comprises an outer drum coupled to the second shaft, wherein a portion of the outer drum is disposed outward along the radial direction from the second plurality of stages of blades of the downstream portion of the compressor section, wherein the outer drum is coupled to the second plurality of stages of blades of the downstream portion of the compressor section.

The gas turbine engine of one or more of these clauses, further comprising a structural member connected between the outer drum and the second shaft, wherein the structural member transfer rotation from the second shaft to the outer drum.

The gas turbine engine of one or more of these clauses, further comprising a gearbox operably coupled to the first shaft, wherein the gearbox is disposed to receive torque from the first shaft.

The gas turbine engine of one or more of these clauses, further comprising a turbine section disposed downstream along the axial direction from the compressor section, wherein the turbine section comprises: a first rotor stage with a plurality of rotor blades, wherein the first rotor stage is operably coupled to the first shaft; and a second rotor stage disposed to rotate about the axial centerline of the gas turbine engine, wherein the second rotor stage is operably coupled to the second shaft.

The gas turbine engine of one or more of these clauses, wherein the first plurality of stages of blades of the downstream portion and the at least one stage of blades of the upstream portion are configured to rotate with one another in a ratio ranging from 2:1 to 1:2.

The gas turbine engine of one or more of these clauses, further comprising: wherein the shaft assembly further comprises a fourth shaft; a gearbox operably coupled to the fourth shaft, wherein the gearbox is disposed to drive rotation of the fourth shaft; and a booster compressor disposed upstream from the compressor section, wherein the booster compressor comprises a rotor stage that is operably coupled to and is driven by the fourth shaft.

The gas turbine engine of one or more of these clauses, wherein the upstream portion of the compressor section further comprises a variable inlet guide vane disposed upstream from the at least one stage of stator vanes and from the at least one stage of blades.

The gas turbine engine of one or more of these clauses, wherein the at least one stage of blades of the upstream portion comprises a plurality of stages of blades.

The gas turbine engine of one or more of these clauses, wherein the downstream portion is disposed immediately downstream of the upstream portion such that the at least one stage of blades of the upstream portion is positioned adjacent to a stage of the second plurality of stages of blades of the downstream portion.

The gas turbine engine of one or more of these clauses, wherein stator vanes of the at least one stage of stator vanes comprise variable pitch stator vanes.

The gas turbine engine of one or more of these clauses, wherein the first plurality of stages of blades and the second plurality of stages of blades of the downstream portion comprise fixed geometry rotor blades.

A compressor section of a gas turbine engine includes an upstream portion and a downstream portion. The upstream portion includes at least one stage of stator vanes and at least one stage of blades configured to rotate about an axial centerline of the compressor section. The at least one stage of stator vanes and the at least one stage of blades are in an alternating arrangement along an axial direction of the gas turbine engine. The downstream portion is disposed immediately adjacent to and downstream along the axial direction from the upstream portion. The downstream portion includes a first set of rotating blade rows and a second set of rotating blade rows. The first and second sets of rotating blade rows are in an alternating arrangement along the axial direction of the gas turbine engine. The first and second sets of rotating blade rows are in a counter-rotating arrangement.

The compressor section of one or more of these clauses, wherein the upstream portion of the compressor section further comprises a variable inlet guide vane disposed upstream from the at least one stage of stator vanes and from the at least one stage of blades.

The compressor section of one or more of these clauses, wherein stator vanes of the at least one stage of stator vanes comprise variable pitch stator vanes.

The compressor section of one or more of these clauses, wherein the first set of rotating blade rows and the second set of rotating blade rows of the downstream portion comprise fixed geometry rotor blades.

The compressor section of one or more of these clauses, further comprising an outer drum disposed outward along a radial direction from the second set of rotating blade rows of the downstream portion of the compressor section.

The compressor section of one or more of these clauses, wherein the outer drum is coupled to and drives rotation of the second set of rotating blade rows of the downstream portion.

The compressor section of one or more of these clauses, further comprising: a first shaft disposed to rotate about the axial centerline of the compressor section, wherein the first shaft is connected to and drives the at least one stage of blades of the upstream portion and the first set of rotating blade rows of the downstream portion; and a second shaft disposed to rotate about the axial centerline of the compressor section, wherein the second shaft rotates in an opposite direction from the first shaft, wherein rotation of the second shaft drives rotation of the second set of rotating blade rows of the downstream portion.

We claim:

1. A gas turbine engine defining an axial centerline and an axial direction, the gas turbine engine comprising:
    a compressor section disposed along and configured to rotate about the axial centerline, the compressor section comprising a booster compressor and a second compressor located downstream of the booster compressor, the second compressor comprising:
        an upstream portion comprising at least one stage of stator vanes and at least one stage of blades that is configured to rotate about the axial centerline of the gas turbine engine, wherein the at least one stage of stator vanes and the at least one stage of blades are in an alternating arrangement along the axial direction;
        a downstream portion disposed downstream along the axial direction from the upstream portion, the downstream portion comprising a first plurality of stages of blades disposed along the axial centerline and a second plurality of stages of blades disposed along the axial centerline, wherein the first plurality of stages of blades and the second plurality of stages of blades are in an alternating arrangement along the axial direction and are in a counter-rotating arrangement;
    a shaft assembly comprising first and second shafts disposed to rotate about the axial centerline of the gas turbine engine, wherein the first shaft is configured to rotate in an opposite direction from the second shaft, wherein the at least one stage of blades of the upstream portion and the first plurality of stages of blades of the downstream portion are driven by the first shaft, wherein the second plurality of stages of blades of the downstream portion is driven by the second shaft, and wherein the shaft assembly further comprises a booster shaft; and a gearbox operably coupled to the booster shaft, wherein the gearbox is disposed to drive rotation of the booster shaft, wherein the booster compressor comprises a rotor stage that is operably coupled to and is driven by the booster shaft, and wherein the gearbox is also operably coupled to the first shaft and disposed to receive torque from the first shaft.

2. The gas turbine engine of claim 1, wherein the downstream portion is directly abutting the upstream portion.

3. The gas turbine engine of claim 2, wherein the gas turbine engine further defines a radial direction and further comprises an outer drum coupled to the second shaft, wherein a portion of the outer drum is disposed outward along the radial direction from the second plurality of stages of blades of the downstream portion of the compressor section, wherein the outer drum is coupled to the second plurality of stages of blades of the downstream portion of the compressor section.

4. The gas turbine engine of claim 3, further comprising a structural member connected between the outer drum and the second shaft, wherein the structural member transfer rotation from the second shaft to the outer drum.

5. The gas turbine engine of claim 2, further comprising a turbine section disposed downstream along the axial direction from the compressor section, wherein the turbine section comprises:

a first rotor stage with a plurality of rotor blades, wherein the first rotor stage is operably coupled to the first shaft; and a second rotor stage disposed to rotate about the axial centerline of the gas turbine engine, wherein the second rotor stage is operably coupled to the second shaft.

6. The gas turbine engine of claim 1, wherein the first plurality of stages of blades of the downstream portion and the at least one stage of blades of the upstream portion are configured to rotate with one another in a ratio ranging from 2:1 to 1:2.

7. The gas turbine engine of claim 1, wherein the upstream portion of the compressor section further comprises a variable inlet guide vane disposed upstream from the at least one stage of stator vanes and from the at least one stage of blades.

8. The gas turbine engine of claim 1, wherein the at least one stage of blades of the upstream portion comprises a plurality of stages of blades.

9. The gas turbine engine of claim 8, wherein the downstream portion is disposed immediately downstream of the upstream portion such that the at least one stage of blades of the upstream portion is positioned adjacent to a stage of the second plurality of stages of blades of the downstream portion.

10. The gas turbine engine of claim 1, wherein stator vanes of the at least one stage of stator vanes comprise variable pitch stator vanes.

11. The gas turbine engine of claim 1, wherein the first plurality of stages of blades and the second plurality of stages of blades of the downstream portion comprise fixed geometry rotor blades.

12. A compressor section of a gas turbine engine, the compressor section comprising a booster compressor and a second compressor located downstream of the booster compressor, the second compressor comprising:

an upstream portion comprising:
at least one stage of stator vanes; and
at least one stage of blades that is configured to rotate about an axial centerline of the compressor section, wherein the at least one stage of stator vanes and the at least one stage of blades are in an alternating arrangement along an axial direction of the gas turbine engine; and a downstream portion disposed immediately adjacent to and downstream along the axial direction from the upstream portion, the downstream portion comprising:
a first set of rotating blade rows disposed along the axial centerline of the compressor section;
a second set of rotating blade rows, wherein the first and second sets of rotating blade rows are in an alternating arrangement along the axial direction of the gas turbine engine, wherein the first and second sets of rotating blade rows are in a counter-rotating arrangement;

a first shaft disposed to rotate about the axial centerline of the compressor section, wherein the first shaft is connected to and drives the at least one stage of blades of the upstream portion and the first set of rotating blade rows of the downstream portion;

a second shaft disposed to rotate about the axial centerline of the compressor section, wherein the second shaft rotates in an opposite direction from the first shaft, wherein rotation of the second shaft drives rotation of the second set of rotating blade rows of the downstream portion;

a booster shaft disposed to rotate about the axial centerline of the compressor section;

a gearbox operably coupled to the booster shaft, wherein the gearbox is disposed to drive rotation of the booster shaft, and wherein the gearbox is also operably coupled to the first shaft and disposed to receive torque from the first shaft; and a booster compressor disposed upstream from the compressor section, wherein the booster compressor comprises a rotor stage that is operably coupled to and is driven by the booster shaft.

13. The compressor section of claim 12, wherein the upstream portion of the compressor section further comprises a variable inlet guide vane disposed upstream from the at least one stage of stator vanes and from the at least one stage of blades.

14. The compressor section of claim 12, wherein stator vanes of the at least one stage of stator vanes comprise variable pitch stator vanes.

15. The compressor section of claim 12, wherein the first set of rotating blade rows and the second set of rotating blade rows of the downstream portion comprise fixed geometry rotor blades.

16. The compressor section of claim 12, further comprising an outer drum disposed outward along a radial direction from the second set of rotating blade rows of the downstream portion of the compressor section.

17. The compressor section of claim 16, wherein the outer drum is coupled to and drives rotation of the second set of rotating blade rows of the downstream portion.

* * * * *